Nov. 20, 1945.   W. H. CHURCHILL   2,389,122
TENSION NUT DEVICE
Filed June 5, 1943
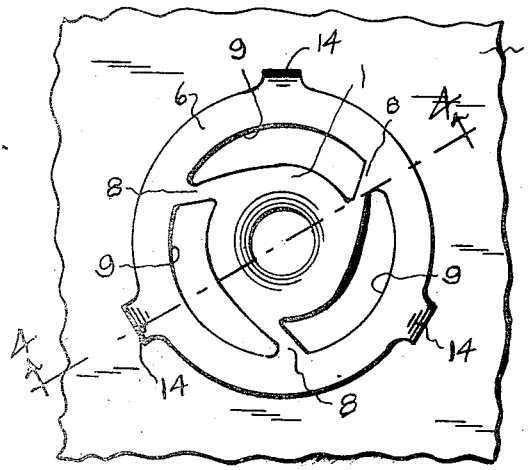
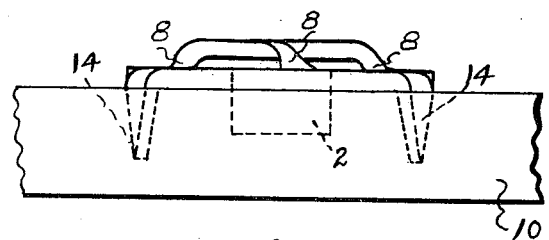
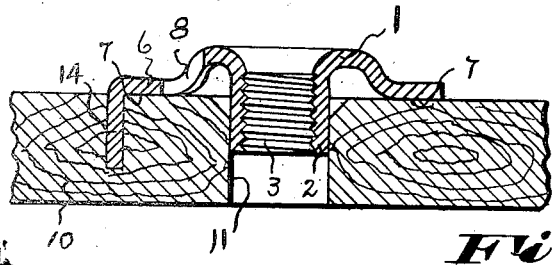
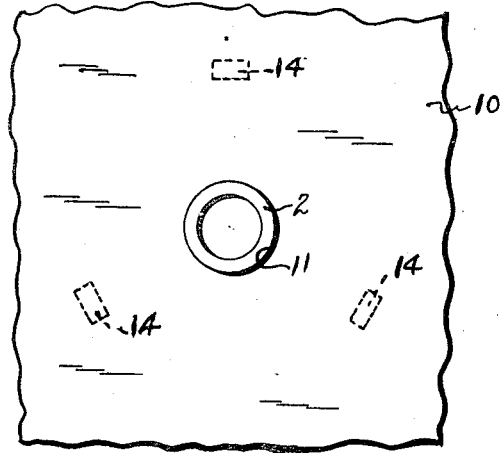
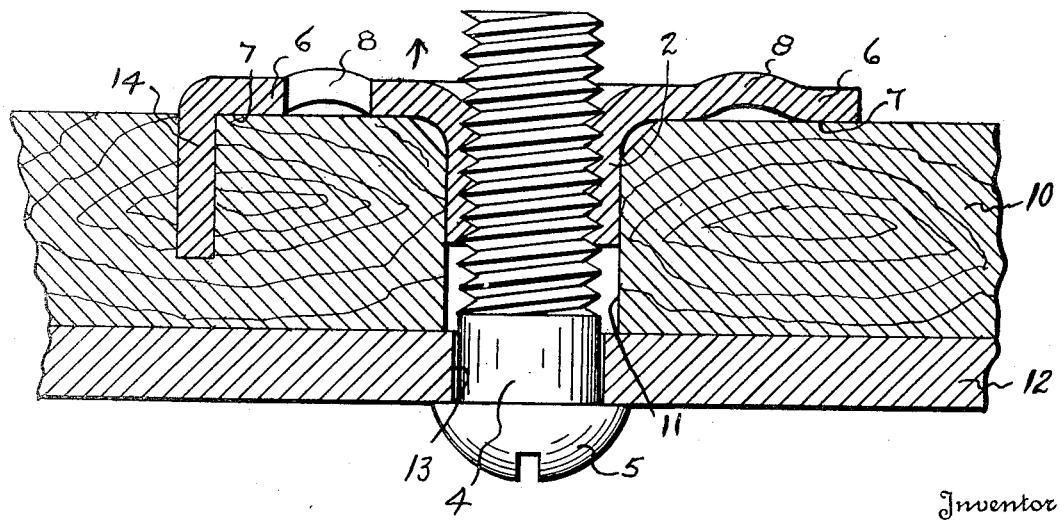
Inventor
Wilmer H. Churchill.
By Walter S. Jones
Attorney Patented Nov. 20, 1945

2,389,122

UNITED STATES PATENT OFFICE 2,389,122

TENSION NUT DEVICE

Wilmer H. Churchill, Saugus, Mass., assignor to United-Carr Fastener Corporation, Cambridge, Mass., a corporation of Massachusetts Application June 5, 1943, Serial No. 489,847

9 Claims. (Cl. 151—33)

The present invention relates to tension nuts for screw threaded fastenings and aims generally to improve and simplify existing nuts of this type.

One of the primary objects of the invention is the provision of a nut member of simple construction and design having a screw-threaded fastening-receiving part adapted to engage the fastening and be displaced axially upon tightening of the fastening therein to engage the fastening under resilient tension to hold the assembled parts in fastened position and resist turning of the fastening in loosening direction.

A further aim and object of the invention is the provision of a nut device of the above-described character having integral means for effecting ready attachment of the nut device to a supporting panel.

Other aims and objects of the invention will be apparent to those skilled in the art from the following detailed description of a preferred embodiment thereof, reference being had to the accompanying drawing, in which—

Fig. 1 is an enlarged top plan view of my improved nut device as applied to a portion of a supporting panel;

Fig. 2 is a side view thereof;

Fig. 3 is a bottom plan view thereof;

Fig. 4 is a central vertical sectional view thereof; and

Fig. 5 is a much enlarged vertical sectional view of a fastened installation embodying my improved nut device.

Referring to the drawing, the embodiment of the invention selected for illustration therein, which is but one preferred form of the invention, comprises a nut device having a head 1 and an integral tubular barrel portion 2 disposed at right angles thereto and internally threaded as at 3 to receive and engage the threads of a screw-threaded fastening member, such as a screw 4, which may be provided with a head 5 of suitable design. Advantageously the head 1 and barrel 2 may be made from a single piece of sheet metal, the barrel being drawn from the head so as to be of tubular form with its axis disposed at right angles to the plane of the head. The threaded barrel is of a length in excess of the thickness of the sheet metal head, as is clearly shown in Figs. 4 and 5, thus providing a relatively long nut barrel for substantial lengthy engagement with the screw 4.

The nut member comprises a rim portion 6 disposed radially outwardly from the head 1 and preferably having a relatively flat bearing surface 7 disposed in a plane spaced from the plane of the head 1. Preferably the plane of the bearing surface 7 is parallel to the plane of the head 1 and intersects the barrel 2 intermediate the head 1 and the free open end of the barrel 2, as is shown in Figs. 2 and 4. As herein illustrated, the rim 6 may be in the form of an annular ring member completely surrounding the head 1 but obviously other shapes and forms of a rim may be employed.

The head 1 and rim 6 are connected by integral resilient portions or bands 8 acting normally to hold the head 1 outwardly and in a plane spaced from the plane of the rim 6. The resilient connecting portions 8 may be of any desired form and construction. One simple satisfactory construction of resilient connecting portion is shown in the accompanying drawing wherein the connecting portions 8 are in the form of relatively narrow bands, one edge of which is tangential to the periphery of the head 1. In the illustrated form of the invention, three of these resilient tangential bands 8 are employed and the intermediate metal between adjacent bands and between the head 1 and rim 6 is removed, providing openings 9, so as to increase the resiliency of the connecting portions 8. The connecting portions or bands 8 are obviously outwardly bent from the inner edge of the rim 6 to the outer edge of the head, so as to maintain the head in its outward spaced relationship, as shown in Figs. 2 and 4.

The nut device is adaptable to cooperate with a screw-threaded fastening member 4, such as a screw or bolt, for securing a supporting part 10 and a supported part 12 together as is shown in Fig. 5. The supporting part 10 is provided with an aperture 11 of a size to receive the barrel 2 of the nut device and the supported part 12 is apertured as at 13 for passage of the shank of the screw therewith for engagement with the nut device. The parts 10 and 12 may be of any suitable material, but in the illustrated form the supporting part 10 may be of wood, plywood, fibre or like puncturable material and the nut device may be securely attached thereto by integral tapered prongs 14 attached to the periphery of the rim 6 and pressed into the material of the supporting part and, if desirable, it may pass through and be clenched over the opposite face thereof. When the material of the supporting part 10 is compressible, such as wood, fibre and the like, the clenched ends may be embedded in the material and confined between the opposed faces thereof.

It will be understood that the nut device in its normal position on the supporting part 10 is as shown in Figs. 2 and 4 with the head 1 of the nut spaced outwardly from the plane of the rim 6 and the adjacent face of the support 10. In this position the threaded fastening member 4 may be readily threaded into the nut without undue resistance. As the screw 4 approaches its tightened or clamped position, the barrel 2 is drawn into the aperture 11 against the tension of the resilient connecting portions or bands 8 until the head 1 engages and abuts the adjacent face of the supporting part 10. The resilient portions 8 continue to exert a tension in the direction of the arrow (Fig. 5) tending to move the head 1 and barrel 2 of the nut device outwardly from the support aperture 11, thus providing a tension for holding the head 5 of the screw clamped against the supported part 12. The action of the resilient portions 8 in subjecting the head and barrel 2 to an outward tension also acts upon the threads of the screw to provide a tension against turning of the screw in loosening or unclamping direction. Thus the invention provides a tensioned nut device for screw-threaded fastenings that will provide a tension to hold the parts to be fastened in clamped position as well as to provide a tension-resisting turning of the screw in loosening direction after the parts have been securely clamped together.

The invention provides an extremely simple and efficient one-piece tension nut device which may be readily applied to bodies of vehicles, aircraft and the like, many of which have supporting parts of plywood, fibre and the like to which is bolted a cover or like supported part. In such installations the provision of the integral attaching prongs is of considerable advantage in saving time in mounting the nut on the supporting part.

Although I have illustrated and described a preferred form of my invention, I do not wish to be limited thereby because the scope of my invention is best defined by the following claims.

I claim:

1. A tension nut for screw-threaded fastenings comprising a nut portion having a head and internally threaded barrel connected at one end to said head at substantially right angles thereto, a support-engaging rim surrounding said head in spaced relation thereto and disposed in a plane intersecting said barrel between the head and free open end thereof, and resilient means connecting said head and rim permitting displacement of the barrel relative to said rim upon tightening of the screw-threaded fastening therein.

2. A tension nut for screw-threaded fastenings comprising a nut portion having a head and internally threaded barrel connected at one end to said head at substantially right angles thereto, a support-engaging rim surrounding said head in spaced relation thereto and disposed in a plane intersecting said barrel between the head and free open end thereof, and resilient bands connecting said nut head and rim.

3. A tension nut for screw-threaded fastenings comprising a nut portion having a head and internally threaded barrel connected at one end to said head at substantially right angles thereto, a support-engaging rim surrounding said head in spaced relation thereto and disposed in a plane intersecting said barrel between the head and free open end thereof, and resilient bands connecting said nut head and rim, one edge of said bands being tangential to said nut head.

4. A tension nut for screw-threaded fastenings comprising a nut portion having a head and internally threaded barrel connected at one end to said head at substantially right angles thereto, a support-engaging rim surrounding said head in spaced relation thereto and disposed in a plane intersecting said barrel between the head and free open end thereof, and resilient bands connecting said nut head and rim, one edge of said bands being tangential to said nut head, and means integral with said rim for attaching said nut device to a support.

5. A tension nut for screw-threaded fastenings comprising a nut portion having a head and internally threaded barrel connected at one end to said head at substantially right angles thereto, a support-engaging rim surrounding said head in spaced relation thereto and disposed in a plane intersecting said barrel between the head and free open end thereof, and resilient bands connecting said nut head and rim, one edge of said bands being tangential to said nut head, and a plurality of prongs integral with said rim and adapted to penetrate the material of a support for attaching the nut device thereto.

6. A nut device for cooperation with a screw-threaded fastening for securing a part to an apertured support, said nut device comprising a nut portion having an internally threaded barrel positioned in the aperture of said support and an integral head spaced outwardly from the adjacent face of said support, a rim surrounding said head in spaced relation thereto and engaging the adjacent face of said support, and resilient means connecting said nut head and rim.

7. A nut device for cooperation with a screw-threaded fastening for securing a part to an apertured support, said nut device comprising a nut portion having an internally threaded barrel positioned in the aperture of said support and an integral head spaced outwardly from the adjacent face of said support, a rim surrounding said head in spaced relation thereto and engaging the adjacent face of said support, and resilient means connecting said nut head and rim, and means for attaching said rim to said support.

8. A nut device for cooperation with a screw-threaded fastening for securing a part to an apertured support, said nut device comprising a nut portion having an internally threaded barrel positioned in the aperture of said support and an integral head spaced outwardly from the adjacent face of said support, a rim surrounding said head in spaced relation thereto and engaging the adjacent face of said support, and resilient means connecting said nut head and rim, said barrel being displaceable in said support aperture under tension of said resilient means as the screw-threaded fastening is tightened in said nut device to exert a tension on said screw-threaded fastening axially and in a clamping direction.

9. A nut device for cooperation with a screw-threaded fastening for securing a part to an apertured support of non-metallic material, said nut device comprising a nut portion having an internally threaded barrel positioned in the aperture of said support and an integral head spaced outwardly from the adjacent face of said support, a rim surrounding said head in spaced relation thereto and engaging the adjacent face of said support, and resilient means connecting said nut head and rim, and a plurality of tapered prongs integral with said rim and penetrating said support for securing the nut device thereto.

WILMER H. CHURCHILL.